WIDE ANGLE LENS SYSTEM

[75] Inventor: Yasuo Takahashi, Tokyo, Japan
[73] Assignee: Asohi Kogaku Kogyo Kabushiki Kaisha, Tokyo-to, Japan
[22] Filed: Mar. 26, 1973
[21] Appl. No.: 345,145

[30] Foreign Application Priority Data
Mar. 28, 1972   Japan.............................. 47-30975

[52] U.S. Cl. ................................ 350/215, 350/176
[51] Int. Cl. ............................................. G02b 9/62
[58] Field of Search ............ 350/214, 215, 176, 177

[56] References Cited
UNITED STATES PATENTS
3,154,628  10/1964  Bertele............................ 350/215 X
3,630,600  12/1971  Bertele............................... 350/215

Primary Examiner—John K. Corbin
Attorney, Agent, or Firm—Wolder & Gross

[57] ABSTRACT

A wide angle lens system includes 10 lenses in which the third, fourth and fifth lenses and the sixth, seventh and eighth lenses are cemented to form respective first and second triplet substems, the system satisfying the following conditions:

$F/0.9 < F_1 < F/0.6$, $F_1 < 0$
$F/0.95 < F_{1.2} < F/0.57$, $F_{1.2} < 0$
$5F < F_2$
$F/2.3 < F_{1.2\ldots 8} < F/1.65$
$F/1.3 < F_{1.2\ldots 9} < F/1.05$
$0.25F < r_{13} < 0.37F$, $r_{13} < 0$
$0.5F < r_{15} < 0.6F$, $r_{15} < 0$
$0.1 < n_4 - n_5 < 0.2$
$0.12F < r_7 < 0.2F$
$\nu_6 - \nu_7 < 0.6$
$0.05 < n_8 - n_7 < 0.15$
$0.18 < r_{11} < 0.26F$, $r_{11} < 0$ Wherein F is the focal length of the entire system, $F_{1.2\ldots i}$ is the focal length of the subsystem including the first to the $i$ th lens, $F_i$ is the focal length of the $i$ th lens, $N_i$ is the d-line refractive index of the $i$ th lens, $\nu_i$ is the Abbe's number of the $i$ th lens, and $r_j$ is the radius of curvature of the $j$ th lens surface, cemented confronting lens faces defining a single surface.

1 Claim, 5 Drawing Figures

SPHERICAL ABERRATION
SINE CONDITION
—— SA
---- SC

CHROMATIC ABERRATION
—— d-LINE
---- g-LINE

DISTORTION

ASTIGMATISM
—— ΔS
---- ΔM

WIDE ANGLE LENS SYSTEM

The present invention relates generally to improvements in lens systems and it relates particularly to an improved wide angle lens system.

The conventional wide angle lens system generally possess optical properties which leave much to be desired. They are usually characterized by high distortions and aberrations and are of a nature which inhibits adequate compensation and correction of these optical drawbacks.

It is thus a principal object of the present invention to provide an improved lens system.

Another object of the present invention is to provide an improved wide angle lens system.

Still another object of the present invention is to provide a highly distortion free wide angle lens system.

The above and other objects of the present invention will become apparent from a reading of the following description taken in conjunction with the accompanying drawing which illustrates a preferred embodiment thereof.

In a sense the present invention contemplates the provision of a highly distortion free wide angle lens system including ten consecutively designated lenses, the third, fourth and fifth lenses being cemented together to form a first triplet subsystem and the sixth, seventh and eighth lenses being cemented together to form a second triplet subsystem, the lens system satisfying the following conditions (I) through (IX):

(I) $F/0.9 < F_1 < F/0.6$, $F_1 < 0$ (II) $F/0.95 < F_{1,2} < F/0.57$, $F_{1,2} < 0$
   $5F < F_2$ (III) $F/2.3 < F_{1,2...8} < F/1.65$ (IV) $F/1.3 < F_{1,2...9} < F/1.05$ (V) $0.25F < r_{13} < 0.37F$, $r_{13} < 0$ (VI) $0.5F < r_{15} < 0.6F$, $r_{15} < 0$ (VII) $0.1 < n_4 - n_5 < 0.2$
   $0.12F < r_7 < 0.2F$ (VIII) $\nu_6 - \nu_7 < 0.6$ (IX) $0.05 < n_8 - n_7 < 0.15$
   $0.18F < r_{11} < 0.26F$, $r_{11} < 0$

Wherein F is the focal length of the entire system, $F_{1,2...i}$ is the focal length of the subsystem including the first through the $i$th lens, $F_i$ is the focal length of the $i$th lens, $N_i$ is the d-line refractive index of the $i$th lens, $\nu_i$ is the Abbe's number of the $i$th lens, and $r_j$ is the radius of curvature of the $j$th lens surface, cemented lens faces defining a single surface. The first, fourth, sixth, eighth, ninth and 10th lenses are negative, the third, fifth and seventh lenses are positive and both triplet subsystems are positive.

The conditions to be satisfied by the present improved lens system according to the present invention and their application are hereinafter described in detail.

The condition (I) serves to prescribe the power of the first lens and is a general requirement in the wide-angle lens system in order that the following groups do not involve any wide angle requirements. It is possible in the present lens system to employ a first lens of smaller dimension by providing this first lens with substantially high power since a lens of lower power is used as the second lens. When $F_1$ is shorter than $F/0.9$, however, the effect of size reduction and light amount increase is improved on one hand, and a Petzval's sum is reduced and coma aberration is intensified on the other hand. Compensation of this inconvenience by the other system components would be difficult unless the optical system is made substantially more complicated. When $F_1$ is longer than $F/0.6$, the lens diameter must be larger to increase the light amount. Furthermore, it is obvious that the effect of reducing the incident angle on the third and the following lenses becomes less significant with a result that compensation of various types of aberration in the following groups would be difficult.

The condition (II) serves to prescribe the power not only of the subsystem comprising the first and the second lenses but also of the second lens itself. When $F_1$ is near to $F/0.9$, $F_{1,2}$ shorter than $F/0.95$ would bring about the disadvantages previously mentioned with respect to the condition (I). When $F_1$ is longer than $F/0.6$, $F_{1,2}$ longer than $F/0.57$ would also result in that the effect in the preceding groups becomes less noticeable and compensation of various types of aberration is difficult. The function of $F_2$, however, lies in suitable control of any difference between distortion occurring on the third and the fourth surfaces.

The condition (III) is to prescribe the power of the ninth lens in association with the condition (IV) and influences upon compensation of distortion aberration in association with the condition (V), as well. The condition (III) will be explained in relation with the other types of aberration. Although, when $F_{1,2...8}$ is shorter than $F/2.3$, $F_{1,2...9}$ may be properly compensated in the proximity of $F/1.3$, the overall compensation would be easily unbalanced since the positive spherical aberration occurring on the 12th surface would be large, compensation thereof would be difficult and the Petzval's sum would diminish. When $F_{1,2...9}$ is shorter than $F/1.3$, the burden on the 10 the lens would increase and the coma aberration would be readily aggravated. $F_{1,2...9}$ being made longer than $F/1.05$, however, would now increase the burden on the ninth lens. When $F_{1,2...8}$ is longer than $F/1.65$, it would be difficult for the 10th lens to control the distortion aberration making the use of the condition (VI) unless $F_{1,2...9}$ is kept from being longer than $F/1.05$. It is obvious that this relies upon the position of light rays and the factors such as spacings and lens thickness cannot be neglected. The power of the ninth lens is thus defined by the foregoing conditions.

The condition (V) is to prescribe $r_{13}$ and enables a proper compensation of distortion aberration on this surface in association with the foregoing conditions. This will now be described with respect to each type of aberration. When $r_{13}$ is shorter than $0.25F$, the spherical aberration which has occurred and has been compensated only to an extremely insufficient extent on the 12th surface would be compensated in excess of the balance. With respect to the distortion, there is a possibility that this could not be sufficiently compensated on the 14th surface. When $r_{13}$ is longer than $0.37F$ on the contrary, the spherical aberration would remain insufficiently compensated while the distortion could not be easily compensated on the 14th surface.

The condition (VI) is to enable a proper compensation of any distortion occurring on the 16th surface of the 10th lens on the assumption that the lens has no appreciable power.

The condition (VII) serves to prescribe the refractive power at the seventh surface and is effective for compensation of spherical aberration and sine condition. In view of the fact that the seventh surface preferably has no influence upon the oblique light rays, the difference of refractive indices should be properly limited within the range from 0.1 to 0.2. The difference of refractive indices lower than 0.1 would interfere with compensation of spherical aberration and sine condition and such a compensation could not be accomplished unless $r_7$ is greater than 0.12F. On the other hand, the difference of refractive indices higher than 0.2 would require $r_7$ to be less than 0.7F and possibly have an adverse influence upon the oblique light rays.

The condition (VIII) is to indicate means by which the coma aberration is compensated independently of the chromatic aberration, wherein the difference of $v$ values in excess of ±0.6 would unsuitably increase the variation of coma aberration which depends upon the particular colors.

The condition (IX) is to compensate the spherical aberration in the direction of excessive compensation especially without any influence upon the other types of aberration such as distortion. Even when $r_{11}$ is shorter than −0.18F, the other types of aberration would be adversely influenced insofar as the difference of refractive indices is not higher than 0.05. On the contrary, when the difference of refractive indices is higher than 0.15, even $r_{11}$ being higher than −0.26F would increase the refractive power, substantially affecting the other types of aberration.

The improved wide angle lens system is of very low distortion as is evidenced by its aberration curves and provides excellent optical performance.

DESCRIPTION OF THE PREFERRED EMBODIMENT

Figure 1:
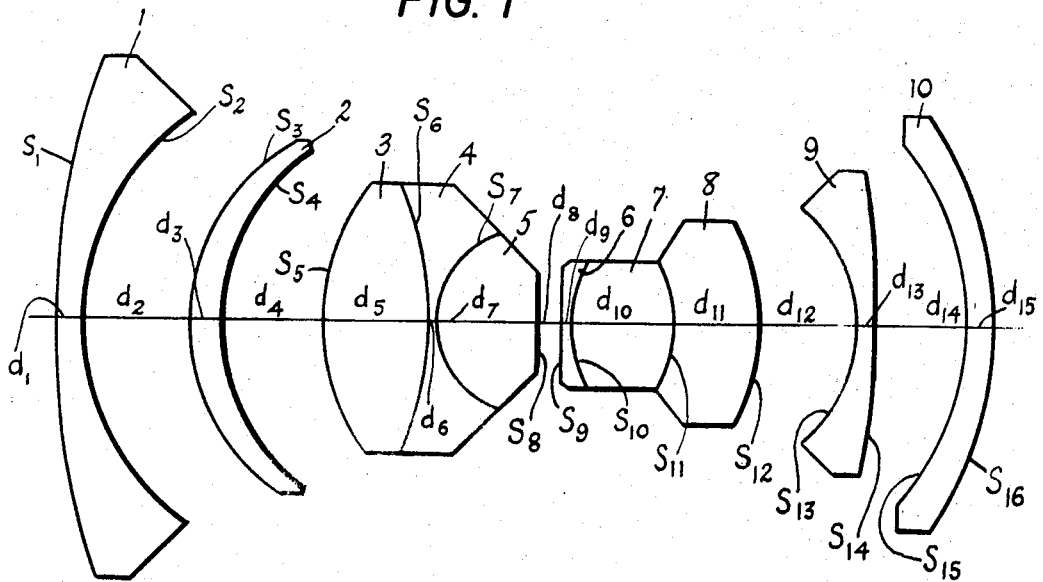
FIG. 1 is a front elevational view of a wide angle lens system embodying the present invention.

Referring now to the drawing which illustrates a preferred embodiment of the present invention, the reference numerals 1 to 10 generally consecutively designate successive lenses from the front lens 1 on the object side to the rear lens 10 on the image side. The second lens 2 is air spaced from first lens 1 and third lens 3 is air spaced from second lens 2. The successive third, fourth and fifth lenses, 3, 4 and 5 are cemented at their respective confronting mating faces to form a first positive triplet lens subsystem and the successive sixth, seventh and eighth lenses 6, 7 and 8 are cemented at their respective confronting mating faces to form a positive second triplet lens subsystem. The ninth lens 9 is air spaced from the eighth lens 8 and the 10th lens 10 is air spaced from the ninth lens 9.

The first lens 1 is a negative meniscus lens of thickness $d_1$, index of refraction $n_1$, Abbe's number $v_1$ with a convex front surface $S_1$ of radius of curvature $r_1$ and a concave rear surface $S_2$ of radius of curvature $r_2$ less than $r_1$. The second lens 2 is a meniscus lens of lesser power than lens 1 and is of thickness $d_3$, index of refraction $N_2$, Abbe's number $v_2$ with a convex front surface $S_3$ of radius of curvature $r_3$ and spaced from surface $S_2$ a distance $d_2$ and a concave rear surface $S_4$ of radius of curvature $r_4$. The third lens 3 is a positive biconvex lens of thickness $d_5$, index of refraction $N_3$ and Abbe's number $v_3$, with a front surface $S_5$ of radius of curvature $r_5$ spaced a distance $d_4$ from surface $S_4$ and a rear surface $S_6$ of radius of curvature $R_6$. The fourth lens 4 is a negative biconcave lens of thickness $d_6$, index of refraction $N_4$ and Abbe's number $v_4$, with a front face mating and cemented to surface $S_6$ and a rear surface $S_7$ of radius of curvature $r_7$. The fifth lens 5 is a positive lens of thickness $d_7$, index of refraction $N_5$ and Abbe's number $v_5$ with a front face mating and cemented to surface $S_7$ and a rear surface $S_8$ of radius of curvature $r_8$.

The sixth lens 6 is a negative lens of thickness $d_9$, index of refraction $N_6$ and Abbe's number $v_6$ with a front surface $S_9$ of radius of curvature $r_9$ and spaced a distance $d_8$ from surface $S_8$ and a rear surface $S_{10}$ of radius of curvature $r_{10}$. The seventh lens 7 is a doubly convex positive lens of thickness $d_{10}$, index of refraction $N_7$ and Abbe's number $v_7$ with a front face mating and cemented to surface $S_{10}$ and a rear surface $S_{11}$ of radius of curvature $r_{11}$ and the eighth lens 8 is a negative lens of thickness $d_{10}$, index of refraction $r_8$ and Abbe's number $v_8$ with a front face mating and cemented to surface $S_{11}$ and a rear surface $S_{12}$ of radius of curvature $r_{12}$. The ninth lens 9 is a negative meniscus lens of thickness $d_{13}$, index of refraction $N_9$ and Abbe's number $v_9$ with a concave front surface $S_{13}$ of radius of curvature $r_{13}$ spaced from surface $S_{12}$ a distance $d_{12}$ and a rear surface $S_{14}$ of radius of curvature $r_{14}$ and greater than $r_{13}$. The 10th lens 10 is a negative lens of less power than ninth lens 9 and is of a thickness $d_{15}$, index of refraction $N_{10}$ and Abbe's number $v_{10}$ and has a front surface $S_{15}$ of radius of curvature $r_{15}$ and spaced a distance $d_{14}$ from surface $S_{14}$ and a rear surface $S_{16}$ of radius of curvature $r_{16}$.

The following Table I sets forth as specific example of the improved lens system by way of illustration, the radii of curvatures $r_j$ of the lens surfaces $S_1$ to $S_{16}$, the distance $d_j$ between each surface $S_j$ and the next successive surface $S_{j+1}$, the distances being lens thicknesses or air spaces and are measured along the optical axis, $n_i$ the d-line index of refraction of the $i$ th lens and $v_i$ the Abbe's number of the $i$th lens. The lens system has a focus F = 100, it being understood that the radii $r_j$ and the distances $d_j$ may be proportionately changed for changes in lens system focal length F. Also set forth are the focal lengths $F_1$, $F_2$ and $F_{10}$ of lenses 1, 2 and 10, $F_{1,2}$ the focal length of lens 1 and 2, $F_{1,2,3,4,5,6,7,8,}$ the focal length of the lens subsystem including lenses 1 through 8 and $F_{1,2,3,4,5,6,7,8,9,}$ the focal length of the subsystem including lenses 1 through 9.

TABLE I

| | | | | | |
|---|---|---|---|---|---|
| $r_1$ | 170.00 | $d_1$ | 4.53 | $n_1/v_1$ | 1.51633/64.1 |
| $r_2$ | 46.44 | $d_2$ | 21.54 | | |
| $r_3$ | 39.80 | $d_3$ | 7.69 | $n_2/v_2$ | 1.51633/64.1 |
| $r_4$ | 40.72 | $d_4$ | 18.77 | | |
| $r_5$ | 44.48 | $d_5$ | 20.00 | $n_3/v_3$ | 1.69700/48.5 |
| $r_6$ | −70.42 | $d_6$ | 3.08 | $n_4/v_4$ | 1.72000/43.7 |
| $r_7$ | 17.44 | $d_7$ | 20.00 | $n_5/v_5$ | 1.58215/42.1 |
| $r_8$ | 215.37 | $d_8$ | 4.62 | | |
| $r_9$ | 738.87 | $d_9$ | 3.08 | $n_6/v_6$ | 1.57135/52.9 |
| $r_{10}$ | 30.50 | $d_{10}$ | 20.00 | $n_7/v_7$ | 1.69350/53.3 |
| $r_{11}$ | 22.85 | $d_{11}$ | 16.92 | $n_8/v_8$ | 1.80518/25.4 |
| $r_{12}$ | −41.76 | $d_{12}$ | 18.46 | | |
| $r_{13}$ | −32.43 | $d_{13}$ | 4.15 | $n_9/v_9$ | 1.51633/64.1 |
| $r_{14}$ | −257.17 | $d_{14}$ | 18.46 | | |
| $r_{15}$ | −53.93 | $d_{15}$ | 4.95 | $n_{10}/v_{10}$ | 1.51633/64.1 |
| $r_{16}$ | −73.63 | | | | |

$F_1 = -125.3$
$F_{1,2} = -139.3$
$F_2 = 885$
$F_{1,2,3,4,5,6,7,8,} = 51.2$
$F_{1,2,3,4,5,6,7,8,9} = 89.9$
$F_{10} = -427$

The following Table II sets forth the Seidel's coefficients for the lens system set forth in Table I.

| | $S_1$ | $S_2$ | $S_3$ | P | $S_5$ |
|---|---|---|---|---|---|
| 1 | 0.05 | 0.05 | 0.05 | 0.20 | 0.27 |
| 2 | −7.92 | 2.09 | −0.55 | −0.73 | 0.34 |
| 3 | 17.80 | −3.38 | 0.64 | 0.86 | −0.29 |
| 4 | −14.05 | 1.80 | −0.23 | −0.84 | 0.14 |
| 5 | 18.40 | −0.50 | 0.01 | 0.92 | −0.03 |
| 6 | −0.41 | 0.16 | −0.06 | −0.01 | 0.03 |
| 7 | −26.74 | 1.49 | −0.08 | −0.29 | 0.02 |
| 8 | −0.01 | −0.03 | −0.06 | −0.17 | −0.54 |
| 9 | 0 | 0 | −0.01 | 0.05 | 0.55 |
| 10 | 3.82 | 0.78 | 0.16 | 0.15 | 0.05 |
| 11 | −9.93 | −0.05 | 0 | −0.16 | 0 |
| 12 | 33.44 | −0.22 | 0 | 1.07 | −0.01 |
| 13 | −13.21 | −1.59 | −0.19 | −1.05 | −0.15 |
| 14 | 0.69 | −0.46 | 0.31 | 0.13 | −0.30 |
| 15 | −0.93 | 0 | 0 | −0.63 | 0 |
| 16 | 0.49 | −0.11 | 0.02 | 0.46 | −0.11 |
| ε | 1.49 | 0.03 | 0.01 | −0.04 | 0 |

Figure 2A:
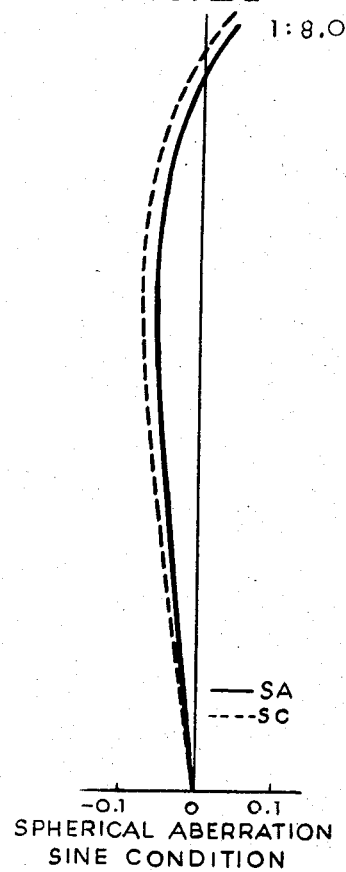
FIGS. 2(a) to 2(d) are curves illustrating the aberration characteristics of the lens system.
Figure 2B:
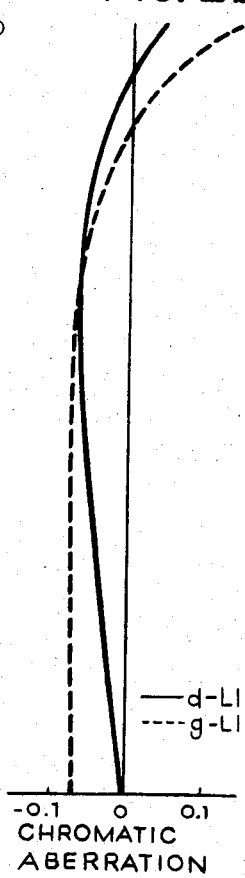
Figure 2C:
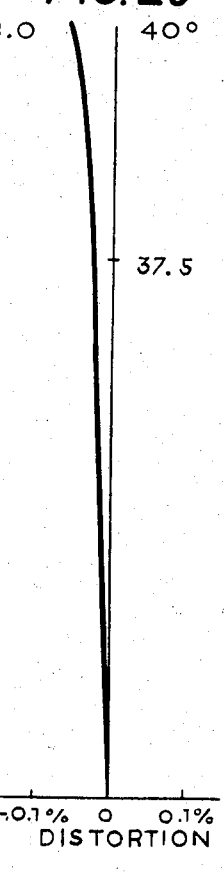
Figure 2D:
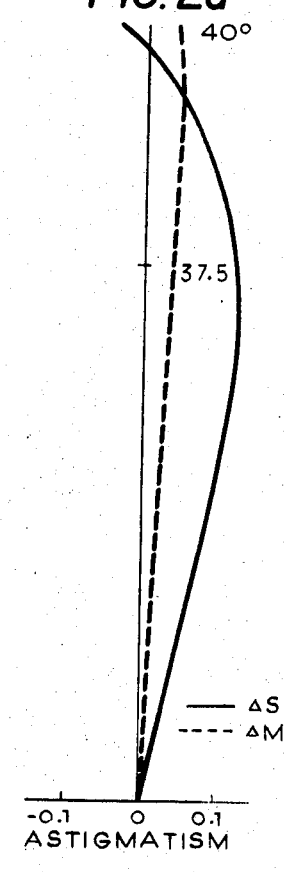

The highly superior optical properties and performance of the lens system set forth in Table I are demonstrated by the group of aberration curves of this lens system as illustrated in FIGS. 2(a) to 2(d).

While there has been described and illustrated in preferred embodiment of the present invention, it is apparent that numerous alterations and additions may be made without departing from the spirit thereof.

I claim:

1. A wide angle lens system comprising ten consecutively designated lenses in which the third, fourth and fifth lenses are joined at their mating confronting faces to form a first triplet sub-system and the sixth, seventh and eighth lenses are joined at their mating confronting faces to form a second triplet sub-system and having the following dimensions and values:

| | | | | | |
|---|---|---|---|---|---|
| $r_1$ | 170.00 | $d_1$ | 4.53 | $n_1/\nu_1$ | 1.51633/64.1 |
| $r_2$ | 46.44 | $d_2$ | 21.54 | | |
| $r_3$ | 39.8 | $d_3$ | 7.69 | $n_2/\nu_2$ | 1.51633/64.1 |
| $r_4$ | 40.72 | $d_4$ | 18.77 | | |
| $r_5$ | 44.48 | $d_5$ | 20.00 | $n_3/\nu_3$ | 1.69700/48.5 |
| $r_6$ | −70.42 | $d_6$ | 3.08 | $n_4/\nu_4$ | 1.72000/43.7 |
| $r_7$ | 17.44 | $d_7$ | 20.00 | $n_5/\nu_5$ | 1.58215/42.1 |
| $r_8$ | 215.37 | $d_8$ | 4.62 | | |
| $r_9$ | 738.87 | $d_9$ | 3.08 | $n_6/\nu_6$ | 1.57135/52.9 |
| $r_{10}$ | 30.50 | $d_{10}$ | 20.00 | $n_7/\nu_7$ | 1.69350/53.3 |
| $r_{11}$ | 22.85 | $d_{11}$ | 16.92 | $n_8/\nu_8$ | 1.80518/25.4 |
| $r_{12}$ | −41.76 | $d_{12}$ | 18.46 | | |
| $r_{13}$ | −32.43 | $d_{13}$ | 4.15 | $n_9/\nu_9$ | 1.51633/64.1 |
| $r_{14}$ | −257.17 | $d_{14}$ | 18.46 | | |
| $r_{15}$ | −53.93 | $d_{15}$ | 4.95 | $n_{10}/\nu_{10}$ | 1.51633/64.1 |
| $r_{16}$ | −73.63 | | | | | wherein $r_j$ is the radius of curvature of the $j$th lens surface, mating joined confronting lens faces defining a single surface, $d_j$ is the distance between the $j$th surface and the $j+1$ surface, the surfaces being consecutively designated from the front to the rear lens surface, $d_j$ is the distance between the $j$th surface and the $j+1$ surface, $r_j$ and $d_j$ being relative to the focal length F of the entire lens system being equal to 100, $N_i$ is the $d$-line refractive index of the $i$th lens and $\nu_i$ is the Abbe's number of the $i$th lens.

* * * * *

UNITED STATES PATENT OFFICE
CERTIFICATE OF CORRECTION

Patent No. 3,825,321          Dated July 23, 1974

Inventor(s) Yasuo Takahashi

It is certified that error appears in the above-identified patent and that said Letters Patent are hereby corrected as shown below:

-- [73] Assignee: Asahi Kogaku Kogyo Kabushiki Kaisha, Japan --

Signed and Sealed this twentieth Day of April 1976

[SEAL]

Attest:

RUTH C. MASON
*Attesting Officer*

C. MARSHALL DANN
*Commissioner of Patents and Trademarks*